Sept. 3, 1957    J. L. MAHONEY    2,804,832
REEL OVEN
Filed Jan. 18, 1954    2 Sheets-Sheet 2
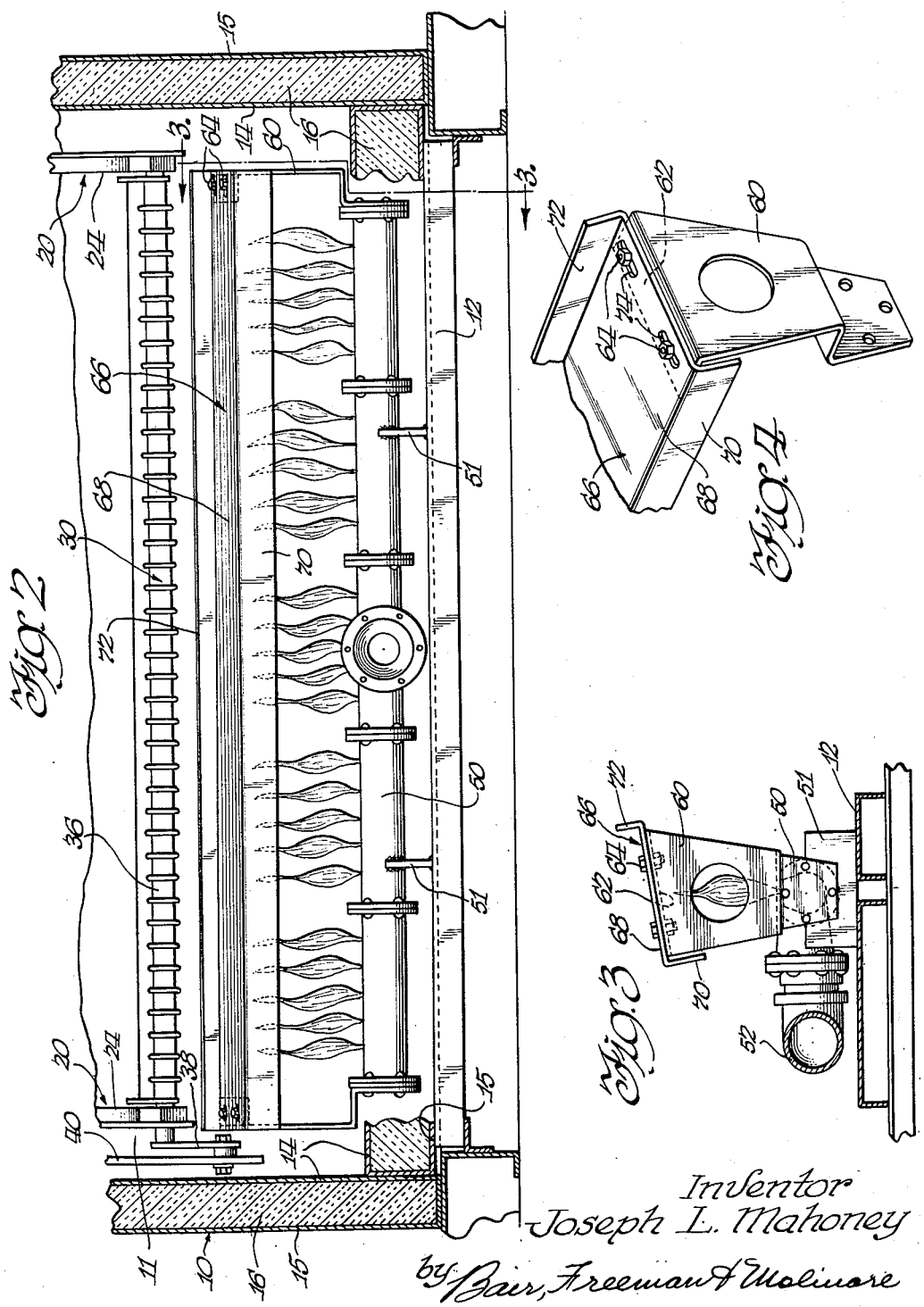
Inventor
Joseph L. Mahoney
by Bair, Freeman & Molinare
Attys.

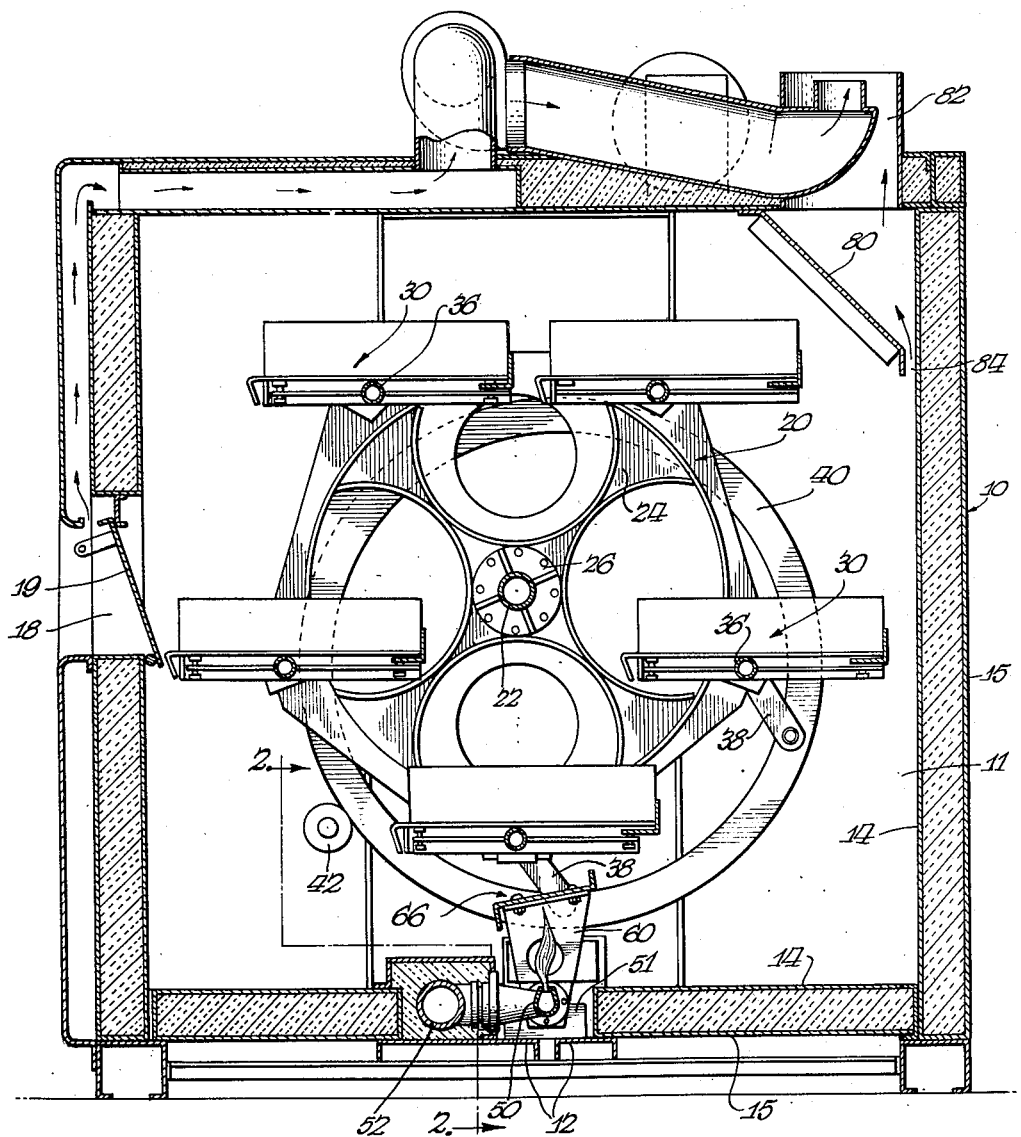

United States Patent Office 2,804,832
Patented Sept. 3, 1957

2,804,832
REEL OVEN

Joseph L. Mahoney, Franklin Park, Ill., assignor to The Petersen Oven Company, Franklin Park, Ill., a corporation of Illinois Application January 18, 1954, Serial No. 404,709

2 Claims. (Cl. 107—59)

This invention relates to commercial baking ovens of the type characterized as "reel" ovens. Ovens of this general class are adapted for heating or baking of various articles or matterials and are especially suitable for baking of foodstuffs, such as bread.

Reel type ovens comprise a reel assembly mounted within a heated baking chamber for rotation about a substantially horizontal axis. The reel assembly usually is provided with a plurality of circumferentially spaced apart trays for supporting of foodstuffs or other materials while being moved in a rotary path within the baking chamber.

The present invention is more particularly directed to reel ovens of the type employing a direct fired burner. Ovens of this class are usually provided with a single opening in one of the upright walls thereof and with respect to which the trays of the reel assembly are adapted to be registered for loading and unloading of foodstuffs or other materials with respect to the trays. Because of the relatively high temperatures required in ovens of this type, it has been observed that the operator, when the door to the oven opening is in open position, is exposed to relatively high temperatures which make the task of loading and unloading of the oven relatively unpleasant and uncomfortable. Direct fired types of ovens of this class present certain difficulties with respect to obtaining and maintaining relatively uniform heat distribution throughout the oven and which is highly desired in order to obtain relatively uniform baking and browning characteristics of the foodstuffs being baked. Heretofore, there have been numerous efforts made to provide special constructions in direct fired reel ovens with a view to obviating or minimizing the above objectionable conditions. One of said prior efforts to rectify the objectionable conditions consisted in providing a horizontally disposed, relatively flat baffle formed of brick or other ceramic material positioned immediately above the direct fired burners. Other proposed arrangements include the provision of an open V type of baffle or an inverted V type of baffle immediately above the burners. It has been found that none of these prior arrangements satisfactorily solve the problems of reducing the temperature at the loading and unloading opening of the oven, as well as maintaining proper heat distribution within the oven so as to obtain uniform baking characteristics.

One of the objects of the present invention is to provide a novel and improved baffle arrangement for use in connection with direct fired heating apparatus in a reel type of baking oven which effectively and substantially reduces the temperature at the loading and unloading opening of the oven.

Another object is to provide a novel baffle arrangement for association with a direct fired type of heating apparatus in a reel oven so as to insure proper distribution of heat within the oven and thereby obtaining relatively uniform baking characteristics of foodstuffs or the like.

Still another object is to provide a novel baffle arrangement for use in connection with direct fired type of heating apparatus for a reel type of baking oven, which is inexpensive to manufacture, easy to install, and which is durable and efficient in use.

Other advantages of the present invention will be apparent from the following description, taken in connection with the accompanying drawings, in which:

Figure 1 is a vertical, sectional view through a reel type of oven, provided with the novel baffle arrangement embodying the present invention;

Figure 2 is a fragmentary, slightly enlarged, vertical sectional view, taken substantially as indicated at line 2—2 on Figure 1;

Figure 3 is an enlarged end elevational view of the direct fired burner apparatus, together with the novel baffle arrangement embodying the present invention;

Figure 4 is an enlarged, perspective, fragmentary view of one end of the baffle arrangement.

As illustrated in the drawings, the reel oven includes a walled enclosure, indicated generally at 10, defining a baking chamber 11. The walls comprising the side walls and the top and bottom walls are usually formed of a multiplicity of separate panel elements interconnected together. Each of the panel elements comprise a pair of spaced apart plates 14 and 15, between which is disposed a body of heat insulating material 16.

The front wall of the oven, as may be seen in Figure 1 of the drawings, is provided with a suitable horizontally extending, elongated opening 18, adapted to be closed by a hinged door 19. Said opening affords access to the interior of the baking chamber 11 for the passage of foodstuffs or other materials therethrough for loading and unloading with respect to a reel assembly, indicated generally at 20.

The reel assembly 20 includes a horizontally extending, tubular shaft 22, journaled at its ends in suitable bearings, not shown, associated with the opposite side walls of the oven. It is to be understood that one end of said shaft protrudes through one of the side walls of the oven and is provided with suitable driving connections to a source of power, and by virtue of which the reel assembly is caused to be rotated about a substantially horizontal axis. The reel assembly comprises a pair of axially spaced apart end plates 24 which are bolted to suitable flanges 26, and which flanges are welded or otherwise rigidly secured on the tubular shaft 22. Supported by the end plates are a plurality of circumferentially and equidistantly spaced apart trays, indicated generally at 30. Each of the trays is mounted on a tubular supporting member 36, and each of said members 36 is journal supported at its respective ends, in the end plates 24. One end of each of said members 36 is connected by a pivotal arm 38, the opposite end of which arm is pivotally connected to an annular stabilizing ring 40. The stabilizing ring is normally rotated with the reel assembly and is disposed in a position, off-center and downwardly with respect to the axis of the reel assemly, and serves to control the relative position of the trays 30. When the ring is properly adjusted, it serves to maintain the trays with their main supporting surfaces disposed in substantially horizontal planes, at all times during the path of travel of the trays as the reel assembly is rotated within the oven chamber. To control the positioning of the stabilizing ring, an eccentrically mounted roller 42 is positioned in engagement with the periphery of the stabilizing ring, so that it is confined to a predetermined path of travel by said roller, together with the provision of either another roller or a suitable shoe, not shown, which may be located in approximately diametrically opposite relation to the roller 42. The stabilizing arrangement for the trays of the reel assembly does not constitute a part of the present invention and the details of construction and operation of a suitable stabilizing arrangement is disclosed in my copending application Serial No. 79,761, filed March 5, 1949, now Patent No. 2,725,020, dated November 29, 1955.

The oven chamber is heated by a direct fired burner, as indicated at 50, which is of elongated form and which is constructed so as to provide a multiplicity of separate burners or jets along the length thereof. The burner extends substantially parallel to the axis of and is located immediately below the reel assembly. As shown in the drawings, the bottom wall of the oven is formed to accommodate the burner substantially within the thickness of the bottom wall so as to reduce the height of the oven to a practical minimum. The burner is preferably made up in a plurality of flanged sections which are secured together and the assembly is supported and welded in place to a plurality of saddle brackets 51 which, in turn, are welded to structural elements 12, forming a support for the bottom wall of the oven. Fluid fuel, such as gas or oil, is supplied to the burner from a single conduit, indicated at 52, which extends through the wall of oven to a source of fuel supply, and the opposite end is connected to the elongated burner, substantially midway of its length.

The baffle arrangement which constitutes the present invention comprises a pair of upright brackets 60, which are rigidly attached directly to the opposite ends of the burner 50, such as by bolts or other suitable form of fastening means. The upper end of each of the brackets is provided with an inturned flange 62, formed to extend at an oblique angle to horizontal and each of the flanges is apertured to receive bolts 64. Seated on the respective flanges 62 of said brackets is a baffle, indicated generally at 66, and which comprises a main panel portion 68, the forward edge of which terminates in a depending flange 70, and the rear edge of which terminates in an upwardly extending flange 72. The flat panel portion 68 is provided with elongated slots 74 through which the bolts 64 project and by virtue of which the baffle is secured to the supporting brackets 60.

As may be seen in the drawings, the baffle is positioned immediately above the burner 50 and beneath the reel assembly and is disposed with the main panel portion 68 in a plane inclined to horizontal, extending in a rearwardly and upwardly direction with respect to the loading and unloading opening 18 of the oven. By reason of the inclination of the flat panel portion 68 of the baffle, as well as the provision of the depending flange 70 at its forward edge, the heat produced by the direct fired burner 50, to a relatively large degree, is caused to be directed toward the rear portion of the oven chamber. The slots 74 in the baffle plate permit limited fore and aft movement of said baffle plate so as to obtain a desired position of adjustment with respect to said burner.

By virtue of my novel construction, it has been found that the oven temperature at the loading and unloading opening 18, when the door 19 is in open position preparatory to loading and unloading of the trays 30, is substantially reduced so that the operator may conveniently and comfortably load and unload the oven. From tests made, it has been determined that by reason of the provision of the novel baffle arrangement embodying the present invention, the temperature at the opening of the oven may be reduced from an approximate range of 170° F. to approximately 120° F. By effecting this substantial reduction in temperature at the loading and unloading opening of the oven, it is now possible for the operator to more efficiently and comfortably place articles on and remove them from the trays of the oven. Furthermore, it is now possible for the operator to effect a proper spacing of the articles on the trays and which is important in order to obtain uniformity of baking in the oven. It has also been found that by reason of the novel baffle arrangement that the heat produced by the direct fired burner is more properly distributed within the oven chamber and insures obtaining greater uniformity in baking characteristics of the oven.

To further assist in maintaining proper heat distribution within the oven chamber, I provide a baffle, as indicated at 80, immediately below the stack opening 82, and which baffle extends transversely of the oven chamber in a downwardly and rearwardly inclined direction with the lower edge terminating in close spaced apart relation to the rear wall of the oven so as to form a vent or spill duct 84 for the stack 82. The location of the spill duct also tends to direct the heated air toward the rear portion of the baking chamber.

Although I have herein shown and described a preferred embodiment of my invention, manifestly it is capable of modification and rearrangement of parts without departing from the spirit and scope thereof. I do not, therefore, wish to be understood as limiting this invention to the precise embodiment herein disclosed, except as I may be so limited by the appended claims.

I claim:

1. For use with an oven having a loading and unloading opening, and a reel assembly comprising a rotatable reel within the oven having a plurality of trays movable in a revolving path when the reel is rotated and said trays being registrable with said opening for loading and unloading, and a direct fired, elongated burner unit positioned in the lower portion of the oven, below said reel; the improvement comprising baffle means having a main panel portion positioned above and in vertical registration with said burner unit and disposed in a rearwardly and upwardly inclined direction with respect to said opening in the oven, the lower forward edge of said panel portion terminating in a depending flange.

2. For use with an oven having a loading and unloading opening, and a reel assembly comprising a rotatable reel within the oven having a plurality of trays movable in a revolving path when the reel is rotated and said trays being registrable with said opening for loading and unloading, and a direct fired, elongated burner unit positioned in the lower portion of the oven, below said reel; the improvement comprising baffle means having main panel portion positioned above and in vertical registration with said burner unit and disposed in a rearwardly and upwardly inclined direction with respect to said opening in the oven, the lower forward edge of said panel portion terminating in a depending flange and the upper rear edge of said panel portion terminating in an upwardly extending flange.

References Cited in the file of this patent

UNITED STATES PATENTS

| 123,086 | Coburn | Jan. 30, 1872 |
| 271,806 | Crumbie | Feb. 6, 1883 |
| 691,674 | Thomas | Jan. 21, 1902 |
| 1,399,750 | Dalton et al. | Dec. 13, 1921 |
| 2,106,052 | Faulds | Jan. 18, 1938 |
| 2,145,482 | Houlis | Jan. 31, 1939 |

OTHER REFERENCES

Baking Industry, Feb. 28, 1953, page 154 (a copy of this printed publication may be found in the Scientific Library of the U. S. Patent Office).